(No Model.)
T. ZWERMANN.
PROCESS OF ENAMELING SHEET IRON WARE.
No. 517,992. Patented Apr. 10, 1894.
WITNESSES:
INVENTOR
ATTORNEYS.

UNITED STATES PATENT OFFICE.

THEODOR ZWERMANN, OF BALTIMORE, MARYLAND.

PROCESS OF ENAMELING SHEET-IRON WARE.

SPECIFICATION forming part of Letters Patent No. 517,992, dated April 10, 1894.

Application filed January 5, 1894. Serial No. 495,821. (No specimens.)

*To all whom it may concern:*

Be it known that I, THEODOR ZWERMANN, a citizen of the United States, residing at Baltimore, in the State of Maryland, have invented certain new and useful Improvements in Processes of Enameling Sheet-Iron Ware, of which the following is a specification.

This invention relates to an improvement in the art or process of enameling sheet-iron ware, by which a mottled or speckled durable enamel is obtained on the surface of the same, and the invention consists of the process herein described of enameling sheet-metal ware by first applying to said articles a ground enamel mixed with prepared glass-flitters and a suitable metallic oxide, then drying and fusing the same, and then applying a second transparent enamel or glaze and drying and burning the same.

The accompanying drawing represents a side-elevation of a sheet-metal article, with my improved enamel.

In carrying out my invention, I prepare a so-called first coat or ground enamel of the usual ingredients, namely, feld-spar, soda, quartz-syenite, borax and saltpeter, melt the same together and grind the same with clay to a paste. Glass flitters or thin leaves of glass are then treated with a solution of potassium bichromate, transparent white glue, and a suitable metallic oxide, according to the color which is to be imparted to the mottling. The so treated glass flitters are then dried by exposing them to the action of light, so that the mixture becomes insoluble in water, whereby it exerts no discoloring influence on the ground enamel with which it is to be mixed. The ground enamel, being in the form of paste and ready to be applied to the sheet-metal articles to be coated, is mixed with the prepared glass-flitters and applied to the surface of the cleaned and pickled articles to be enameled, either by dipping or otherwise. The enamel is then dried and fused in the usual manner. After the first coat is fused on the ware, a second coat is applied, which contains feldspar, quartz, saltpeter, soda, cryolite and bone ash or tin oxide, which is dried and fused in the same manner. By fusing of the enamel, the color of the metallic oxide is produced, which in connection with the glass-flitters produces a peculiar, well-defined mottling, as shown in the drawing. The coloring oxides used are the well known, namely, for blue, cobalt oxide, for purple, manganese oxide, for brown, ferric oxide, and for green, chrome oxide, &c. The same effect can also be obtained by moistening the glass-flitters and mixing them with a dry metallic oxide, and sprinkling the same over the moist coating of ground enamel, which is applied to the surface of the sheet-metal article, and then drying and fusing the same. A second coat of transparent enamel or glaze is then applied to the articles coated with the ground-enamel, as described, the glaze being of any approved composition and being dried and fused in the usual manner. The articles have clearly-defined configurations, corresponding to the sizes of the glass-flitters employed, the size of which can be varied so as to change thereby the size of the specks while the different metallic oxides impart the desired color to the same.

Having thus described my invention, I claim as new and desire to secure by Letters Patent—

1. The process herein described of enameling sheet-metal ware, which consists in applying to said articles a ground enamel mixed with prepared glass-flitters and a suitable metallic oxide, next drying and fusing the same, and then applying a second transparent enamel or glaze, and drying and fusing the same, substantially as set forth.

2. The process herein described of enameling sheet-metal ware, which consists in preparing an ordinary ground enamel, adding thereto a dry mixture of glass-flitters, potassium bichromate, transparent glue and a metallic oxide, applying the mixture to the surface of the sheet-metal article, and drying and fusing the same, substantially as set forth.

3. A composition for producing mottled enameled sheet-iron ware, which consists of an ordinary ground enamel mixed with glass-flitters, potassium bichromate, transparent glue and a metallic oxide, substantially as set forth.

In testimony that I claim the foregoing as my invention I have signed my name in presence of two subscribing witnesses.

THEODOR ZWERMANN.

Witnesses:
PAUL GOEPEL,
K. R. BRENNAN.